United States Patent Office 2,983,590
Patented May 9, 1961

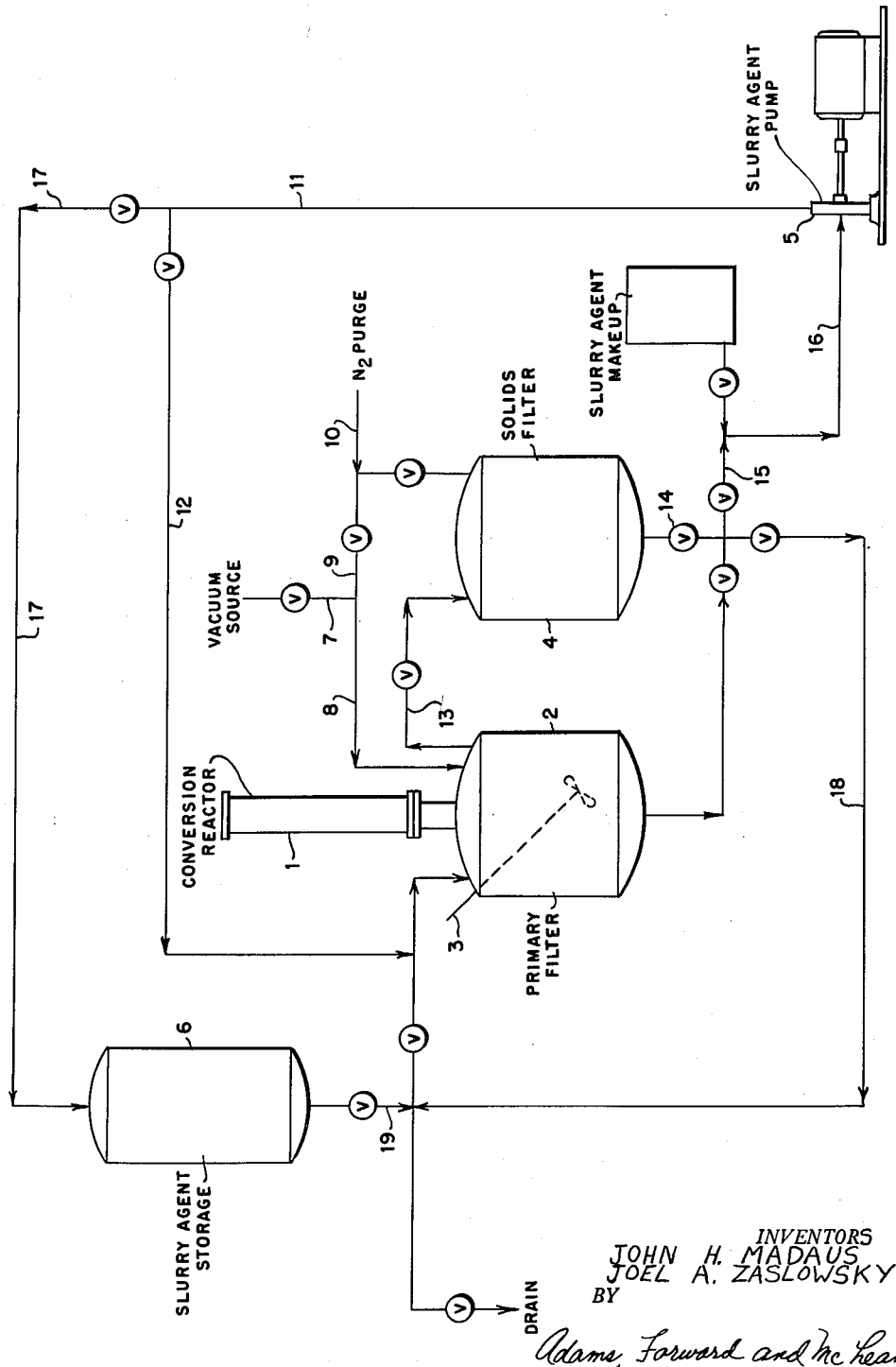

2,983,590

SEPARATION OF DECABORANE FROM A MIXTURE OF SOLID BORON HYDRIDES

Joel A. Zaslowsky and John H. Madaus, Niagara Falls, N.Y., assignors, by mesne assignments, to Olin Mathieson Chemical Corporation, a corporation of Virginia Filed Jan. 19, 1956, Ser. No. 560,113

2 Claims. (Cl. 23—299)

This invention relates to a method for the production of decaborane, a material which can be used as a vulcanizing agent for organic polymers, including natural and synthetic rubbers, as well as for other purposes.

The pyrolysis of diborane to produce pentaborane is well known in the art. Note the article by McCarty and Di Giorgio in J. Am. Chem. Soc. 73, 3138–3143, and the references cited therein. During the pyrolysis of diborane to form a liquid mixture containing pentaborane, approximately 40–60 percent of the diborane can be converted to solid boron hydrides. When this pyrolysis of diborane is carried out, the solid boron hydrides can be separated from the liquid products of pyrolysis by filtration. Since the solids can contain up to about 25 percent by weight of decaborane, it is desirable to have means whereby this decaborane can be separated and recovered in substantially pure form for use.

It has heretofore been known that such solids can be dissolved in kerosene and the solution cooled to precipitate decaborane. This method suffers from the disadvantage, however, that the solution generally contains only a relatively small amount of decaborane, so that the amount which can conveniently be precipitated by cooling is relatively small. This disadvantage is obviated in accordance with the present invention by subjecting the solution of decaborane in kerosene to a vacuum distillation whereby a distillate fraction of increased decaborane content is collected. Concentration may be accomplished by simple distillation or by distillation with rectification. In general, the solution of decaborane subjected to vacuum distillation will contain from about 2 to about 5 percent by weight of decaborane. The decaborane is conveniently separated from the distillate by cooling to precipitate decaborane.

The process will be further described in conjunction with the accompanying drawing, which illustrates an arrangement of apparatus in which the process of this invention can be carried out, the distillation column, of conventional design, being omitted. In the drawing the numeral 1 denotes a conversion reactor in which diborane is pyrolyzed to produce pentaborane and also solid boron hydrides, including decaborane, as side-products of the reaction. The products of conversion pass downwardly from the conversion reactor to primary filter or settling chamber 2 equipped with agitator 3 wherein the solid boron hydrides are separated, the remaining products of reaction passing through a thimble associated with the primary filter and constructed of fine mesh stainless steel wire to a pentaborane recovery system by means not shown. The primary filter is actually a settling chamber in which the solids produced by pyrolysis settle out of the gas stream leaving the conversion reactor. The arrangement of apparatus also includes solids filter 4, slurry agent pump 5 and slurry agent storage tank 6, as well as suitable piping and valves.

When used for the purpose of decaborane recovery in accordance with the present invention, the primary filter, after it has separated a desired portion of the solid boron hydrides, is then isolated from the pentaborane conversion and recovery systems. The solids within the primary filter contain adsorbed or absorbed tetraborane, pentaborane and dihydropentaborane and hence are apt to be pyrophoric. To reduce this hazard, the primary filter is evacuated using lines 7 and 8 for one or two hours before it is filled with nitrogen using lines 8, 9 and 10. Slurrying agent, suitably kerosene, is then dropped from the slurry agent storage tank 6 into the primary filter 2 and solids filter 4, allowing the entire system to be flooded with this agent.

The next step is to start the agitator 3 in the primary filter and then circulate the slurry agent from the slurry agent pump 5 to the top of the primary filter using lines 11 and 12. From the primary filter, slurry passes from the opposite sides of the primary filter through line 13 to the inlet of the solids filter. The slurry agent filtrate then passes through the drain valve 14 at the bottom of the solids filter to the slurry agent pump suction through lines 15 and 16. Upon complete removal of the solids from the slurry, the slurry agent will run clear and appropriate valves are opened so that the primary and solids filters can be drained and the slurry agent pumped to the slurry agent storage tank through lines 11 and 17. Thereafter the solids filter is ready for dumping in order that it will be ready for reuse. Solution from slurry agent storage tank 6 constitutes feed to the distillation column.

It has been observed that a certain amount of decaborane-rich solution remains on the filter cake in the solids filter. Before dumping the filter, a small amount of slurry agent is advantageously added to the solids filter to wash the cake free from this solution and eliminate the loss of decaborane in the filter cake. When this is done, the wash liquid can be pressured by nitrogen from the bottom of the solids filter to the slurry agent storage tank using lines 18 and 19. The solids removed from the solids filter upon dumping are then essentially decaborane-free.

A wide range of temperatures can be used in preparing the solution in hydrocarbon of decaborane which is later subjected to vacuum distillation. Preferably, however, the temperature will be within the range from about 10 to 60° C. Also, the relative amounts of the different solid boron hydrides present in the material treated is subject to considerable variation, depending upon the precise conditions under which the diborane is pyrolyzed. Usually, however, the solid boron hydride mixture treated will contain from about 10 to 25 percent by weight of decaborane, and will be obtained by pyrolyzing diborane under the following conditions: 0 to 100 p.s.i.g.; 150 to 300° C.; 1 to 60 second residence time; amount of diluent hydrogen admixed with the diborane, 25 to 95 weight percent, based on the weight of the diborane.

EXAMPLE I

In a series of runs, diborane was pyrolyzed to produce pentaborane as well as solid boron hydrides including decaborane as side-products of the reaction. In the pyrolysis operation, the diborane in admixture with an equal volume of hydrogen was heated at approximately 50 p.s.i.g. and 250° C. for approximately 3 seconds. The solids formed were separated in the primary filter or settling chamber and the gases left the primary filter through a thimble constructed of fine mesh stainless steel wire. The solids filter, which was a Sparkler filter, was equipped with paper filter discs.

Table I below sets forth typical operating data with respect to the series of runs. In these runs, kerosene was used as the slurry agent and the operating temperatures in all the runs were the ambient temperatures (15–30° C.) of the areas surrounding the equipment.

Table 1

| Run | Gals. kero. in system | Wt. per-B$_{10}$H$_{14}$ in kerosene at end of Run | B$_{10}$H$_{14}$ Product from Run, pounds | Loss of B$_{10}$H$_{14}$ in the kerosene discharged with filter cake, pounds | Accumulative total B$_{10}$H$_{14}$ in kerosene at end of Run, pounds | Accumulative total B$_{10}$H$_{14}$ in kerosene after discharge of filter cake, pounds |
|---|---|---|---|---|---|---|
| Start | 812.2 | 0.40 | 0 | 0 | 4.86 | 4.86 |
| 1 | ¹182.2 | 1.02 | 7.53 | 1.65 | 12.40 | 10.75 |
| 2 | 158.0 | 1.48 | 4.84 | 2.39 | 15.59 | 13.21 |
| 3 | ¹188.8 | 1.60 | 6.94 | 2.58 | 20.18 | 17.57 |
| 4 | 169.6 | 2.22 | 6.81 | 3.58 | 24.41 | 20.82 |
| 5 | ¹180.4 | 2.80 | 12.90 | 4.52 | 33.69 | 29.17 |
| 6 | 171.2 | 3.08 | 6.00 | 4.97 | 35.17 | 30.21 |
| 7 | ¹182.0 | 3.32 | 10.9 | 5.36 | 40.30 | 34.94 |

¹ Storage tank filled to give starting point.
Slurry pump discharge pressure: 29–39 p.s.i.g.
Primary filter pressure: 10–25 p.s.i.g.
Solids filter pressure: 2–10 p.s.i.g.

When the solid boron hydrides are removed from the solids filter, it is advantageous to have a film of the slurry agent covering the solids particles, thereby excluding air and preventing self-igniting of these solids. Since the solids were removed wet with slurry agent from the solids filter, no weights of dry solids formed were obtainable by direct weighing but only by difference.

In Table I, it will be noted that the gallons of kerosene in the system vary considerably from run to run. The reason for this is that a certain amount of kerosene is carried out with the discharged solids from the solids filter. For instance, at the start of run 1 there was present in the system 182.2 gallons of kerosene. However, at the start of run 2, 158.0 gallons of kerosene was in the system. A certain amount of kerosene was carried out with the discharge of the cake from the solids filter at the end of run 1 (24.2 gallons) and at the start of run 2. An additional amount of kerosene was added to the system to bring it up to 188.8 gallons at the start of run 3.

At the start of run 1 the 182.2 gallons of kerosene in the system contained 0.40 weight percent of decaborane which amounted to 4.86 pounds and is shown in the sixth and seventh columns of Table I. In run 1 a total of 182.2 gallons of kerosene was in the system and at the end of the run this kerosene contained 1.02 weight percent of decaborane. At the end of run 1 12.40 pounds of decaborane was in the system and of this amount 1.65 pounds was discharged in the filter cake and 10.75 pounds of decaborane was present in the kerosene. In the fifth column the figure 1.65 pounds is noted under run 1. This figure was determined by taking the difference between 182.2 and 158 or 24.2, which represents the kerosene solution carried out with the filter cake and multiplying it by the weight percent decaborane/100 in the kerosene solution at the end of run 1 (1.02/100) and by the specific gravity of the kerosene. This figure does not actually represent loss of decaborane in the filter cake itself but represents loss of decaborane in the kerosene carried out with the filter cake. The accumulative total of decaborane in the kerosene for the run following the discharge of the filter cake (seventh column) is determined by subtracting the loss of decaborane in the kerosene removed with the filter cake, which was 1.65 pounds, from the total decaborane in the system after the run, which was 12.40 pounds, to give 10.75 pounds.

The following examples illustrate the recovery of decaborane from hydrocarbon solutions, generally at an absolute pressure below 200 mm. of mercury and preferably at an absolute pressure of 10–75 mm. of mercury. The decaborane being more volatile appeared in the distillate in a greater concentration than it was found in the still charge. By cooling the distillate with Dry Ice, the decaborane was precipitated as a crystalline solid which could then be removed by filtration.

EXAMPLE II

The first step in the recovery operation was carried out by distilling the decaborane-kerosene solution in a 1,000 gallon Pfaudler glass-lined steel reactor fitted with an agitator, steam and hot water heating and water cooling in the jacket. The unit was connected to a Pfaudler steam-jacketed glass-lined packed column leading to a Pfaudler glass-lined packed surface condenser. Condensate was collected in two 50-gallon Glascote G glass-lined water-jacketed product receivers. A two-stage steam ejector was connected to the product receivers to pull a vacuum on the system. The distillation unit was first cleaned by distilling anhydrous methanol and then kerosene in the unit. Following the kerosene wash, the kerosene feed solution containing the decaborane was charged to the vessel, the pressure reduced to 20 to 30 mm. of Hg absolute and the unit slowly heated by jacket steam. No agitation was used. In this example 2544 pounds of a kerosene-decaborane solution, which was prepared substantially as described in Example I and which contained 3.8 weight percent (96.6 pounds) of decaborane, was treated for decaborane recovery.

The boiling range of the kerosene solution was controlled to maintain the pot pressure below 30 mm. of Hg absolute. Distillate was collected in the receivers and a cut made at approximately 50 gallon intervals. Each fraction of distillate was run into a separate 55 gallon steel drum. Table II shows the quantity of material obtained in each cut and the decaborane content of the cut. A total of 1596 pounds of decaborane-kerosene distillate was collected in five drums which had a composite analysis of 4.5 weight percent decaborane (86.0 pounds). From the distillation operation there was obtained 885 pounds of bottoms which analyzed 0.4 percent decaborane (3.5 pounds). Upon completion of distillation the pot was cooled by circulation of water through the jacket, the system vented, and the bottoms discharged into the empty feed drums.

The recovery of decaborane from the kerosene-decaborane distillation was carried out by chilling the distillate to −25 to −35° C. by Dry Ice addition. Each drum of kerosene-decaborane distillate was treated separately. Kerosene-decaborane distillate was charged into two insulated, open head, 55 gallon stainless steel drums. Dry Ice, from which condensed moisture had been removed, was added at intervals in small pieces 1–2 in. in diameter). Addition of the Dry Ice was controlled by the amount of foam generated by its addition but a minimum cooling time of 1½ to 2 hours was maintained. After the crystallization temperature had been reached, filtration was started. The slurry was fed by gravity to the filter, vacuum being applied to filter the slurry and move the filtrate into the 55 gallon filtrate drum. Glass cloth was used as the filter medium. Samples were taken of each drum and each cake recovered by crystallization for infrared determination of decaborane content. Data from the operation are recorded in Table III.

*Table II.—Concentration of kerosene-decaborane solution*

FEED SOLUTION

| Wt. Lbs. | $B_{10}H_{14}$ Content | |
|---|---|---|
| | Wt. Percent | Wt. Lbs. |
| 2,544 | 3.8 | 96.6 |

DISTILLATE

| Drum No. | Wt. Lbs. | $B_{10}H_{14}$, Wt. Percent | Content, Wt. Lbs. | Pot Temp. Range °C. | Avg. Press., mm. Hg Abs. |
|---|---|---|---|---|---|
| 1 | 343 | 3.7 | 12.7 | 96–100 | 32 |
| 2 | 307 | 5.1 | 15.7 | 100–105 | 26 |
| 3 | 338 | 6.7 | 22.6 | 105–112 | 26 |
| 4 | 305 | 6.5 | 19.8 | 112–118 | 25 |
| 5 | 303 | 5.0 | 15.2 | 118–138 | 26 |
| Total | 1,596 | 5.4 | 86.0 | | |

BOTTOMS

| Wt. Lbs. | $B_{10}H_{14}$ Content | |
|---|---|---|
| | Wt. Percent | Wt. Lbs |
| 885 | 0.4 | 3.5 |

LOSS

| Wt. Lbs. | $B_{10}H_{14}$, Wt. Lbs. |
|---|---|
| 63 | 7.1 |

Wt. percent of $B_{10}H_{14}$ recovered_____ 92.7
Wt. percent of $B_{10}H_{14}$ recovered in distillate_____ 89
Wt. Percent of kerosene recovered_____ 97.5
Wt. Percent of kerosene recovered in distillate_____ 62.7

*Table III.—Crystallization of decaborane from kerosene distillate*

| Drum No. | Feed Solution, Wt. Lbs. | Cryst. Filtrate, Wt. Lbs. | Feed Analysis, Percent $B_{10}H_{14}$ | Filtrate Analysis, Percent $B_{10}H_{14}$ | Feed $B_{10}H_{14}$ Content, Lbs. | Filtrate $B_{10}H_{14}$ Content, Lbs. | Wet $B_{10}H_{14}$ Cake recovered, Lbs. | Overall Wt. Loss, Lbs. | Avg. Cryst. Temp., °C. |
|---|---|---|---|---|---|---|---|---|---|
| 1 | 343 | 339 | 3.7 | --- | 12.7 | --- | 2.6 | 1 | −20 |
| 2 | 301 | 289 | 5.1 | 3.3 | 15.4 | 9.5 | 12.3 | 0 | −27 |
| 3 | 331 | 301 | 6.7 | 2.8 | 22.2 | 8.4 | 25.2 | 5 | −26 |
| 4 | 299 | 276 | 6.5 | 2.9 | 19.2 | 8.0 | 23.7 | 0 | −27 |
| 5 | 299 | 287 | 5.0 | 2.9 | 15.0 | 8.4 | 11.6 | 0 | −30 |
| Total | 1,573 | 1,492 | 5.4 | 3.3 | 84.5 | 48.9 | 75.4 | 6 | |

EXAMPLE III

In this example 26 drums of the kerosene-decaborane solution prepared substantially as described in Example I were processed for the recovery of decaborane. A total of 8,535 pounds of kerosene-decaborane solution, containing 2.95 weight percent decaborane by analysis (252 pounds), was fed to the distillation unit. In a simple batch distillation with the system at an absolute pressure of 30–40 mm. of Hg, 4,820 pounds of concentrated kerosene-decaborane solution was taken overhead as distillate. This distillate contained 232 pounds of decaborane as shown by analysis. The residue, which weighed 3,662 pounds, contained 0.69 weight percent decaborane or 25.4 pounds. In the next step, the overhead, or distillate, was cooled to −55° C. and the crystalline decaborane filtered off. A total of 93.4 pounds of decaborane was obtained from the 4,668 pounds of filtrate which was charged to the filter. The difference between the 4,820 pounds overhead previously obtained in the distillation procedure and the 4,668 pounds of distillate is due to handling losses of the solvent. The cake was blown with argon in order to free it of kerosene and was then taken up and slurried with 2,491 pounds of methylene chloride. The methylene chloride slurry, after being cooled to −55° C., was filtered and 72 pounds of decaborane, which analyzed 97 percent pure (70 pounds of pure decaborane), was obtained. In the next step the methylene chloride solution filtrate was distilled and approximately 2,207 pounds of pure methylene chloride was taken overhead leaving a residue as bottoms of 284 pounds of methylene chloride containing decaborane. This residue of 284 pounds was cooled to −55° C. and filtered to recover additional decaborane. In this operation 17 pounds of decaborane analyzing 98 percent was obtained, or 16.66 pounds of pure decaborane were obtained. A total of 89 pounds of decaborane cake containing 26 pounds of pure decaborane was obtained in the recovery operations. The residue from the first kerosene distillation as well as the filtrate resulting from the crystallization of decaborane from the kerosene distillate as well as the final methylene chloride filtrate, all containing decaborane, can be reprocessed by the same methods for the recovery of more decaborane.

EXAMPLE IV

In this example a pure decaborane was obtained by recrystallization of crude decaborane which analyzed 95.5 percent pure. The crude decaborane used here was obtained by crystallization from a kerosene-decaborane solution as described in Example II.

In the first step 1040 grams of crude decaborane which analyzed 95.5 percent was added to 3500 mls. of methylene chloride in a 4,000 ml. stainless steel beaker. The beaker was placed in a hot water bath and the contents heated until the temperature of the methylene chloride solution reached about 130° C. A vacuum filtration of the methylene chloride solution through a fritted glass filter was carried out to remove any insoluble material present. The filtered solution was passed directly from the filter into a 5,000 ml. stainless steel vessel which was placed in a pail containing a Dry Ice-acetone slurry. The methylene chloride-decaborane solution was maintained at −78° C. for approximately 70 minutes. During this cooling period the slurry was stirred occasionally to prevent the formation of lumps.

By means of vacuum filtration crystalline decaborane was removed from the slurry. At the conclusion of the filtration operation air was drawn through the filter cake by means of vacuum suction for a period of approximately 10 minutes in order to remove a part of the methylene chloride in the wet cake. In the final step the cake was placed in a vacuum desiccator for approximately 16 hours in order to remove completely the methylene chloride. A total of 949 grams of crystalline decaborane which analyzed 100 percent pure by infrared analysis was recovered.

We claim:
1. In the recovery of decaborane, the step of admixing kerosene and a mixture of solid boron hydrides containing decaborane whereby a solution of the decaborane in said hydrocarbon is obtained, subjecting said solution to vacuum distillation and collecting a distillate fraction having a decaborane content greater than that of said solution, and cooling said distillate fraction to a temperature of about −25° to −55° F. to precipitate solid decaborane.

2. The method of claim 1 wherein the vacuum distillation is conducted at an absolute pressure below 200 mm. of mercury.

References Cited in the file of this patent

Perry: "Chemical Engineers Handbook," 2nd Ed., pages 1340, 1367, 1380–1382, McGraw-Hill Book Co., N.Y., 1941.

Schechter et al.: "Boron Hydrides and Related Compounds," January 8, 1951, declassified January 5, 1954. Dept. of Navy, Bureau of Aeronautics, pages 13, 37.

Hurd: "Chemistry of the Hydrides," 1952, pages 216–218.